(12) United States Patent
Nguyen et al.

(10) Patent No.: US 11,668,284 B2
(45) Date of Patent: Jun. 6, 2023

(54) METHOD OF DETERMINING AN INDUCTION FACTOR FOR A WIND TURBINE EQUIPPED WITH A LIDAR SENSOR

(71) Applicant: IFP Energies nouvelles, Rueil-Malmaison (FR)

(72) Inventors: Hoai-Nam Nguyen, Rueil-Malmaison (FR); Fabrice Guillemin, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 619 days.

(21) Appl. No.: 16/681,573

(22) Filed: Nov. 12, 2019

(65) Prior Publication Data
US 2020/0149512 A1 May 14, 2020

(30) Foreign Application Priority Data
Nov. 12, 2018 (FR) .................. FR18/71.455

(51) Int. Cl.
| | | |
|---|---|---|
| *F03D 7/04* | (2006.01) | |
| *F03D 17/00* | (2016.01) | |
| *F03D 80/80* | (2016.01) | |
| *G05B 19/042* | (2006.01) | |
| *G01S 17/95* | (2006.01) | |

(Continued)

(52) U.S. Cl.
CPC ............... *F03D 17/00* (2016.05); *F03D 7/04* (2013.01); *F03D 80/82* (2016.05); *G01P 5/26* (2013.01); *G01S 17/88* (2013.01); *G01S 17/95* (2013.01); *G05B 19/042* (2013.01); *G05B 2219/2619* (2013.01)

(58) Field of Classification Search
CPC . F03D 17/00; F03D 80/82; F03D 7/04; G01P 5/26; G01S 17/88; G01S 17/95; G05B 19/042; G05B 2219/2619
See application file for complete search history.

(56) References Cited

U.S. PATENT DOCUMENTS

| | | |
|---|---|---|
| 2013/0094961 A1 | 4/2013 | Couchman et al. |
| 2015/0145253 A1 | 5/2015 | Bayon et al. |

(Continued)

FOREIGN PATENT DOCUMENTS

FR 3013777 A1 5/2015

OTHER PUBLICATIONS

Preliminary Search Report for FR 18/71.455, dated Aug. 5, 2019.
(Continued)

*Primary Examiner* — Mohamed Charioui
*Assistant Examiner* — Christine Y Liao
(74) *Attorney, Agent, or Firm* — Fitch, Even, Tabin & Flannery LLP (57) ABSTRACT

The present invention is a method of determining an induction factor of the wind for a wind turbine (1) equipped with a LiDAR sensor (2). For this method, wind speed measurements are performed in measurement planes (PM) by use of LiDAR sensor (2), then induction factors between measurement planes (PM) are determined by use of the measurements and of a first linear Kalman filter, and the induction factor between a measurement plane (PM) and the rotor plane (PR) of wind turbine (1) is determined by a second linear Kalman filter.

8 Claims, 4 Drawing Sheets

(51) Int. Cl.
  *G01P 5/26* (2006.01)
  *G01S 17/88* (2006.01)

(56) References Cited

U.S. PATENT DOCUMENTS

2018/0017039 A1* 1/2018 Davoust .................. G01S 17/58
2019/0338755 A1* 11/2019 Davoust .................. F03D 7/043

OTHER PUBLICATIONS

Eric Simley et al: "Characterization of wind velocities in the upstream induction zone of a wind turbine using scanning continuous-wave lidars", Journal of Renewable and Sustainable Energy, vol. 8, No. 1, (Jan. 1, 2016).

* cited by examiner

METHOD OF DETERMINING AN INDUCTION FACTOR FOR A WIND TURBINE EQUIPPED WITH A LIDAR SENSOR

CROSS REFERENCE TO RELATED APPLICATIONS

Reference is made French Application No. 18/60.212 filed Nov. 6, 2018, which is incorporated herein by reference in its entirety.

BACKGROUND OF THE INVENTION

Field of the Invention

The present invention relates to the field of renewable energies and more particularly to the measurements relating to wind turbines, the wind, with turbine control (orientation, torque and speed regulation) and/or diagnosis and/or monitoring.

Description of the Prior Art

A wind turbine converts the kinetic energy from the wind into electrical or mechanical energy. For conversion of wind to electrical energy, the wind turbine has:

a tower for positioning a rotor at a sufficient height to enable motion thereof (necessary for horizontal-axis wind turbines) or this rotor to be positioned at a height enabling it to be driven by a stronger and more regular wind than at ground level. The tower generally houses part of the electrical and electronic components (modulator, control, multiplier, generator, etc.), a nacelle mounted at the top of the tower, housing mechanical, pneumatic and some electrical and electronic components necessary to operate the machine. The nacelle can rotate to orient the machine in the right direction, a rotor fastened to the nacelle, comprising several blades (generally three) and the nose of the wind turbine. The rotor is driven by wind power and it is connected by a mechanical shaft, directly or indirectly (via a gearbox and mechanical shaft system), to an electrical machine (electric generator) that converts the energy recovered to electrical energy. The rotor is potentially provided with control systems such as variable-angle blades or aerodynamic brakes, a transmission made up of two shafts (mechanical shaft of the rotor and mechanical shaft of the electrical machine) connected by a transmission (gearbox).

Since the beginning of the 1990s, there has been renewed interest in wind power, in particular in the European Union where the annual growth rate is about 20%. This growth is attributed to the possibility for carbon-emission-free electricity generation. In order to sustain this growth, the energy yield of wind turbines still has to be improved. The prospect of wind power production increase requires developing effective production tools and advanced control tools in order to improve the performance of the machines. Wind turbines are designed to produce electricity at the lowest possible cost. They are therefore generally built to reach their maximum performance at a wind speed of approximately 15 m/s. It is not necessary to design wind turbines that maximize their yield at higher wind speeds, which are not common. In case of wind speeds above 15 m/s, it is necessary to lose part of the additional energy contained in the wind to avoid damage to the wind turbine. All wind turbines are therefore designed with a power regulation system.

For this power regulation, controllers have been designed for variable-speed aerogenerators. The purpose of the controllers is to maximize the electrical power that is recovered, to minimize the rotor speed fluctuations, and to minimize the fatigue and the extreme moments of the structure (blades, tower and platform).

To optimize control, it is important to know the wind speed at the rotor of the wind turbine. Various techniques have been developed to that end.

According to a first technique, using an anemometer allows estimation of a wind speed at one point, but this imprecise technology does not enable measurement of an entire wind field or to know the three-dimensional components of the wind speed.

According to a second technique, a LiDAR (Light Detection And Ranging) sensor can be used. LiDAR is a remote sensing or optical measurement technology based on the analysis of the properties of a beam returned to the emitter. This method is notably used for determining the distance to an object by use of a pulse laser. Unlike radars based on a similar principle, LiDAR sensors use visible or infrared light instead of radio waves. The distance to an object or a surface is given by the measurement of the delay between the pulse and the detection of the reflected signal.

In the field of wind turbines, LiDAR sensors are essential to provide proper functioning of large wind turbines, especially now that their size and power is increasing (today 5 MW, soon 12 MW for offshore turbines). This sensor allows remote wind measurements, first allowing wind turbines to be calibrated so that they can deliver maximum power (power curve optimization). For this calibration stage, the sensor can be positioned on the ground and vertically oriented (profiler), which allows measurement of the wind speed and direction, as well as the wind gradient depending on the altitude. This application is particularly critical because it allows knowing the energy generating resource. This is important for wind turbine projects since it conditions the financial viability of the project.

A second application sets the sensor on the nacelle of the wind turbine in order to measure the wind field in front of the turbine while being nearly horizontally oriented. A priori, measuring the wind field in front of the turbine allows knowing in advance the turbulence the wind turbine is going to encounter shortly thereafter. However, current wind turbine control and monitoring techniques do not take into account a measurement performed by a LiDAR sensor by estimating precisely the speed of the wind at the rotor, in the rotor plane. Such an application is notably described in patent application FR-3-013,777 corresponding to US patent application 2015-145,253.

Furthermore, in the past decade, the behavior of the wind formed upstream from a wind turbine, which is the induction zone, has generated growing interest. In the induction zone, the wind is decelerated due to the presence and the operation of the wind turbine, which draws part of the aerodynamic power of the wind. Better understanding of the induction zone allows improvement of the control strategies based on a LiDAR sensor and the wind turbine power evaluations. In the first case, the objective is to use upstream wind measurements to predict the wind speed in the rotor plane. In the latter case, it makes a connection between the power and the speed of the free air flow, which is the wind speed that would have existed at a point corresponding to the position of the wind turbine in the absence of a wind turbine. The interest of the induction zone therefore lies in the use of measurements near the turbine to estimate the rotor effective wind speed.

In the document authored by Emmanuel Simon Pierre Branlard and Alexander Raul Meyer Forsting, entitled "Using a Cylindrical Vortex Model to Assess the Induction Zone in Front of Aligned and Yawed Rotors". In: EWEA Offshore 2015 Conference. European Wind Energy Association (EWEA). 2015, analytical formulas for the velocity field induced by a cylindrical vortex model are applied to assess the induction zone. The results are compared with actuator disc simulations for different operating conditions.

In the document authored by D Medici, Stefan Ivanell, J-Å Dahlberg, and P Henrik Alfredsson, entitled "The Upstream Flow of a Wind Turbine: Blockage Effect". In: Wind Energy 14.5 (2011). pp. 691-697, wind tunnel measurements are used to study the induction zone of various wind turbines. Furthermore, the results are compared with an analytical expression for the induction zone obtained from a linear cylindrical vortex model.

In the document authored by Eric Simley, Nikolas Angelou, Torben Mikkelsen, Mikael Sjöholm, Jakob Mann, and Lucy Y Pao, entitled "Characterization of Wind Velocities in the Upstream Induction Zone of a Wind Turbine Using Scanning Continuous-Wave Lidars". In: Journal of Renewable and Sustainable Energy 8.1 (2016), p. 013301, the induction zone of a wind turbine is studied by use of synchronized continuous wave LiDAR sensors. It has been shown that the standard deviation of the longitudinal velocity component is relatively unchanged when the wind gets closer to the rotor, while the standard deviation of the vertical and lateral component slightly increases.

In the document authored by Niels Troldborg and Alexander Raul Meyer Forsting, entitled "A Simple Model of the Wind Turbine Induction Zone Derived from Numerical Simulations". In: Wind Energy 20.12 (2017), pp. 2011-2020, the induction zone in front of various wind turbines is studied by combining steady state Navier-Stokes simulations and an actuator disc approach. It has been shown that, for distances beyond one rotor radius upstream from the rotor, the induced velocity is similar and independent of the rotor geometry.

For all the approaches in the literature, it should be emphasized that the induction zone is calculated/estimated offline by use of simulations or experimental data. Furthermore, the induction zone is assumed to be implicitly constant for a given wind speed, once identified. Apparently, this induction zone provides a very average level of information on the wind speed deficit since it is clear that the induction zone is a function of the blade and yaw angles for a given wind speed. Therefore, these methods do not allow online and continuous determination of the physical phenomena involved in the induction zone.

SUMMARY OF THE INVENTION

In order to overcome these drawbacks, the present invention relates to a method of determining an induction factor of the wind for a wind turbine equipped with a LiDAR sensor. For this method, wind speed measurements are performed in several measurement planes by use of the LiDAR sensor, then induction factors between the measurement planes are determined from the measurements and use of a first linear Kalman filter, and the induction factor between a measurement plane and the rotor plane of the wind turbine is determined by use of a second linear Kalman filter. Thus, by use of the LiDAR sensor and the Kalman filters, the invention enables simple, efficient and continuous update of the induction zone.

The invention also relates to a method of determining the wind speed in the rotor plane, a wind turbine control method and a wind turbine diagnosis method. These methods using the induction factor are determined with the method according to the invention.

The present invention relates to a method of determining an induction factor of the wind between a measurement plane and the rotor plane of a wind turbine, the wind turbine is equipped with a LiDAR sensor performing a measurement relative to the wind speed in at least three measurement planes distant from the wind turbine. The induction factor represents a wind deceleration coefficient between two distant points upstream from the wind turbine and a deceleration resulting from the operation of the wind turbine in the wind field. The following steps are carried out for this method:

a) measuring the wind speed in at least three measurement planes distant from the wind turbine by use of the LiDAR sensor;

b) determining at least two induction factors of the wind between two of the measurement planes using the wind speed measurements in the measurement planes and a first linear Kalman filter; and c) determining the induction factor of the wind between a measurement plane and the rotor plane of the wind turbine by use of the determined induction factors between two measurement planes including using a second linear Kalman filter.

According to an embodiment, the at least two induction factors of the wind are determined between the measurement planes having known spacings, preferably the same spacing, and preferably the spacing is equal to the distance between the rotor plane and the measurement plane closest to the rotor plane.

According to an implementation, the wind speed measurement is performed in at least four measurement planes, and at least three induction factors of the wind are determined between two measurement planes.

Furthermore, the invention relates to a method of determining the wind speed in the rotor plane of a wind turbine equipped with a LiDAR sensor. The following steps are carried out for this method:

a) determining an induction factor of the wind between a measurement plane and the rotor plane of a wind turbine by use of the method according to one of the above features; and b) determining the wind speed in the rotor plane as a function of the induction factor of the wind between a measurement plane and the rotor plane of a wind turbine, by use of the wind speed measurement in the measurement plane relative to the induction factor of the wind.

According to an embodiment, the wind speed in the rotor plane corresponds to the multiplication of the induction factor of the wind between a measurement plane and the rotor plane of a wind turbine by the wind speed in the measurement plane relative to the induction factor of the wind.

Moreover, the invention relates to a method of controlling a wind turbine equipped with a LiDAR sensor. The following steps are carried out for this method:

a) determining the wind speed in the rotor plane of the wind turbine by use of the method according to one of the above features; and b) controlling the wind turbine as a function of the wind speed in the rotor plane.

The invention further relates to a method for diagnosis and/or monitoring of a wind turbine equipped with a LiDAR sensor. The following steps are carried out for this method:

a) determining an induction factor of the wind between a measurement plane and the rotor plane of a wind turbine by use of the method according to one of the above features;

b) determining the aerodynamic power drawn from the wind by the wind turbine by use of the induction factor of the wind determined between a measurement plane and the rotor plane of a wind turbine; and c) at least one of diagnosing and monitoring the operation of the wind turbine by use of the determined aerodynamic power that is drawn.

According to an aspect, the invention relates to a computer program product comprising code instructions designed to carry out the steps of a method according to one of the above features, when the program is executed on a unit which processes information sensed by the LiDAR sensor.

Furthermore, the invention relates to a LiDAR sensor for a wind turbine comprising a processing unit implementing a method according to one of the above features.

Moreover, the invention relates to a wind turbine comprising a LiDAR sensor according to one of the above features, which is preferably arranged on the nacelle of the wind turbine.

BRIEF DESCRIPTION OF THE DRAWINGS

Other features and advantages of the method according to the invention will be clear from reading the description hereafter of embodiments given by way of non-limitative example, with reference to the accompanying drawings wherein.

DETAILED DESCRIPTION OF THE INVENTION

The invention relates to a method of measuring the resource of wind turbines: wind, in particular with turbine control (orientation, torque and speed regulation) and at least one of diagnosis and monitoring objectives, wherein the wind turbine is at least one of controlled and monitored according to a determination of an induction factor of the wind with the turbine being equipped with a LiDAR sensor to perform this estimation.

The induction factor is a wind deceleration coefficient in the induction zone of the wind turbine. Indeed, the wind is decelerated in the upstream part of the turbine due to the presence of the wind turbine and to the operation thereof. The power drawn by the turbine from the wind causes deceleration of the wind upstream from the turbine. Thus, the induction factor is representative of a physical phenomenon and it gives an indication of the operation of the wind turbine. The induction factor is calculated between two planes upstream from the wind turbine. By definition, it corresponds to the speed ratio between these planes. If a denotes the induction factor, u the wind speed, and d1 and d2 the respective distances of the two planes considered to the rotor plane, the induction factor between the planes located at distances d1 and d2 from the rotor plane can be expressed as:

$$a_{d1,d2} = \frac{u_{d1}}{u_{d2}}$$

When one of the planes is being considered is the rotor plane, d1=0.

According to the invention, the LiDAR sensor allows measurement of the wind speed in (at least three) measurement planes upstream from the wind turbine. There are several types of LiDAR sensors, which for example are scanning LiDAR, continuous wave LiDAR or pulsed LiDAR sensors. Within the context of the invention, a pulsed LiDAR is preferably used. However, the other LiDAR technologies may also be used while remaining within the scope of the invention.

LiDAR sensors allow fast measurement. Therefore, using such a sensor enables fast and continuous determination of the induction factor of the wind. For example, the sampling rate of the LiDAR sensor can range between 1 and 5 Hz, and it can be 4 Hz.

Figure 1:
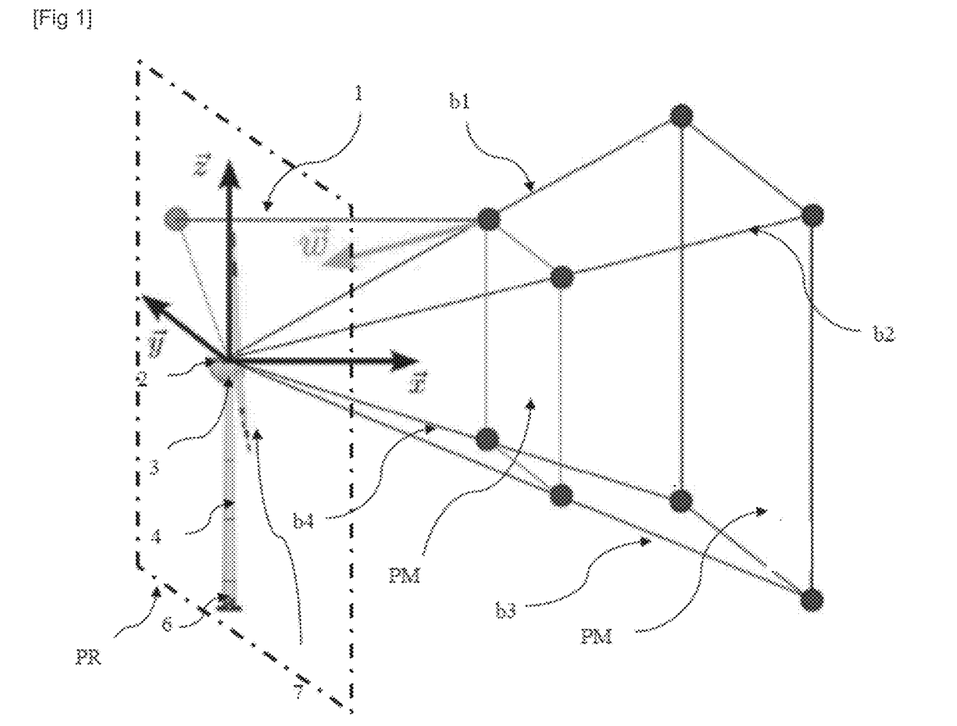
FIG. 1 illustrates a wind turbine equipped with a LiDAR sensor according to an embodiment of the invention.

FIG. 1 schematically shows, by way of non-limitative example, a horizontal-axis wind turbine 1 equipped with a LiDAR sensor 2 for the method according to an embodiment of the invention. LiDAR sensor 2 is used to measure the wind speed at a given distance in measurement planes PM (only two measurement planes are shown). Knowing the wind measurement in advance a priori provides much information. This figure also shows axes x, y and z. The reference point of this coordinate system is the center of the rotor. Direction x is the longitudinal direction corresponding to the direction of the rotor axis, upstream from the wind turbine, this direction also corresponds to the measurement direction of LiDAR sensor 2. Direction y, which is perpendicular to direction x, is the lateral direction located in a horizontal plane (directions x, y form a horizontal plane). Direction z is the vertical direction (substantially corresponding to the direction of tower 4) pointing of this axis that points up. The z axis is perpendicular to axes x and y. The rotor plane is indicated by the rectangle in dotted line PR and is defined by directions y, z for a zero value of x. Measurement planes PM are planes formed by directions y, z at a distance from rotor plane PR (for a non-zero value of x). Measurement planes PM are parallel to rotor plane PR.

Conventionally, a wind turbine 1 converts the kinetic energy of the wind into electrical or mechanical energy. To convert the wind energy into electrical energy, it is made up of the following elements:

a tower 4 allowing a rotor (not shown) to be positioned at a sufficient height to enable motion thereof (necessary for horizontal-axis wind turbines) or this rotor positioned at a height enables being driven by a stronger and more regular wind than at ground level 6. Tower 4 generally houses part of the electrical and electronic components (modulator, control, multiplier, generator, etc.), a nacelle 3 mounted at the top of tower 4, housing mechanical, pneumatic and some electrical and electronic components (not shown) necessary for operating the machine. Nacelle 3 can rotate to orient the machine in the correct direction, the rotor, fastened to the nacelle, comprises several blades 7 (generally three) and the hub of the wind turbine. The rotor is driven by the energy from the wind and it is connected by a mechanical shaft, directly or indirectly (via a gearbox and mechanical shaft system), to an electrical machine (electrical generator) (not shown) that converts the energy recovered to electrical energy. The rotor is potentially provided with control systems such as variable-angle blades or aerodynamic brakes, a transmission made up of two shafts (mechanical shaft of the rotor and mechanical shaft of the electric machine) connected by a transmission (gearbox) (not shown).

As can be seen in FIG. 1, which is an example embodiment of a pulsed LiDAR sensor, the LiDAR sensor 2 used comprises four beams or measurement axes (b1, b2, b3, b4). By way of non-limitative example, the method according to the invention also operates with a LiDAR sensor comprising one or more beams. The LiDAR sensor performs a punctual measurement at each intersection point of a measurement plane PM and a beam (b1, b2, b3, b4). These measurement points are represented by black circles in FIG. 1. Processing the measurements at these measurement points allows determination of the wind speed in measurement planes PM. The wind modelling method which is described in French patent application FR-1,755,675 can therefore notably be applied.

Preferably, LiDAR sensor 2 can be mounted on nacelle 3 of wind turbine 1.

According to the invention, the method of determining an induction factor of the wind between a measurement plane and the rotor plane of a wind turbine comprises the following steps:
1) measuring the wind speed;
2) determining induction factors between measurement planes; and
3) determining the induction factor between a measurement plane and the rotor plane.

Figure 2:
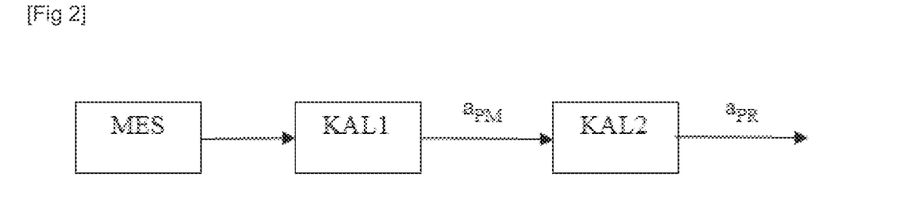
FIG. 2 illustrates the steps of the method of determining an induction factor of the wind according to an embodiment of the invention.

FIG. 2 schematically illustrates, by way of non-limitative example, the steps of the method according to the invention. The first step is a step (MES) measures the wind speed in measurement planes. The second step uses the measurements and a first linear Kalman filter (KAL1) to determine the induction factors between measurement planes denoted by $a_{PM}$. The third step uses the induction factors between measurement planes $a_{PM}$ to determine, by use of a second linear Kalman filter (KAL2), the induction factor of the wind between a measurement plane and the rotor plane denoted by $\alpha_{PR}$.

1. Wind Speed Measurement

In this step, the wind speed is continuously measured in at least three measurement planes distant from the wind turbine, by use of the LiDAR sensor. Thus, the wind speed can be known upstream from the wind turbine in three measurement planes located at different distances from the wind turbine. In other words, the wind speed can be known at three distances from the rotor plane of the wind turbine. For this step, the three wind components (longitudinal, lateral and vertical), as well as the wind speed variations in the measurement plane (the wind speed increases with height for example) are considered.

According to an embodiment of the invention, the wind speed is measured in at least four measurement planes to improve the wind knowledge precision upstream from the wind turbine and, therefore, the precision in estimation of the induction factor of the wind in the rotor plane.

According to an implementation of the invention, the measurement planes can be spaced out by a longitudinal distance (along axis x in FIG. 1) ranging between 50 and 400 m from the rotor plane. It is thus possible to determine the evolution of the wind speed over a long distance upstream from the wind turbine, which also allows increasing the precision in estimation of the induction factors of the wind.

According to a non-limitative example, the LiDAR sensor can perform measurements for ten measurement planes, which can notably be located at distances of 50, 70, 90, 100, 110, 120, 140, 160, 180 and 200 m from the rotor plane respectively.

2. Determining the Induction Factors Between Measurement Planes

This step determines in real time at least two induction factors of the wind between two measurement planes. In other words, at a minimum, a first induction factor is determined between a first measurement plane and a second measurement plane, and a second induction factor is determined between a third measurement plane and a fourth measurement plane (at maximum one of the third and fourth measurement planes corresponds to one of the first and second measurement planes). In a simplified manner, these induction factors are referred to as induction factors between measurement planes in the description hereafter.

According to the invention, the induction factors between measurement planes are determined by use of the wind speed measurements and of a Kalman filter, notably a linear Kalman filter.

Advantageously, for this step and for the embodiment where the measurement is performed for at least four measurement planes, at least three induction factors of the wind between measurement planes are determined. It is thus possible to increase the precision of the wind deceleration phenomenon upstream from the wind turbine and, therefore, the precision in estimation of the induction factor of the wind in the rotor plane.

According to an embodiment of the invention, an induction factor between measurement planes can be determined for the measurement plane closest to the rotor plane, to have information relative to the wind field as close as possible to the rotor plane.

According to an implementation of the invention, the induction factors of the wind between measurement planes can be determined for measurement planes having the same spacing. For example, the spacing can be 50 m and a first induction factor can be determined for measurement planes located at 70 and 120 m, and a second induction factor for measurement planes located at 90 and 140 m.

Preferably, the spacing between the measurement planes used for the induction factors of the wind between measurement planes can be identical to the distance between the rotor plane and the closest measurement plane. Thus, the induction factor model is simplified, which notably facilitates solution of the Kalman filter.

For example, by combining the variants described above, if the first measurement plane is located 50 m from the rotor plane, a first induction factor can be determined for measurement planes located at 50 and 100 m, a second induction factor for measurement planes located at 70 and 120 m, and a third induction factor for measurement planes located at 90 and 140 m.

According to an embodiment of the invention, the Kalman filter can be used with the different steps described hereafter. The steps are described for an embodiment where a first induction factor $a_{50,100}$ is determined for measurement planes located at 50 and 100 m, a second induction factor $a_{70,120}$ for measurement planes located at 70 and 120 m, and a third induction factor $a_{90,140}$ for measurement planes located at 90 and 140 m.

Below, it is only shown how to estimate $a_{50,100}$ in real time. $a_{70,120}$ and $a_{90,140}$ are obtained exactly in the same way. Since $u_{50}$, $u_{100}$ are available in real time, the induction factor definition equation could be directly used to determine $a_{50,100}$. However, this method involves two drawbacks. On the one hand, the information on the standard deviation of the estimated wind speeds $u_{50}$, $u_{100}$ is not used. The standard deviation of estimation $a_{50,100}$ can therefore not be known. On the other hand, a calculation stability problem may occur for low speeds, i.e. when $u_{100}$ is close to zero.

The induction factor at the time k is denoted by $a_{50,100}(k)$. It is clear that the variation $a_{50,100}(k)-a_{50,100}(k-1)$ is relatively small, therefore it can be expressed as:

$$a_{50,100}(k) = a_{50,100}(k-1) + \eta(k-1)$$

where $\eta(k-1)$ is used to describe the variation of $a_{50,100}(k)$ over time.

The first induction factor definition equation is rewritten as:

$$u_{100}(k)a_{50,100}(k) = u_{50}(k).$$

Since estimations $u_{50}(k)$, $u_{100}(k)$ contain noise. A more realistic model of the above equation is:

$$(u_{100}(k) + \epsilon_{100}(k))a_{50,100}(k) = u_{50}(k) + \epsilon_{50}(k)$$

where $\epsilon_{50}(k)$, $\epsilon_{100}(k)$ are the noises for $u_{50}(k)$, $u_{100}(k)$ respectively. The previous equation can then be rewritten as follows:

$$u_{100}(k)a_{50,100}(k) = u_{50}(k) + \epsilon_{50}(k) - \epsilon_{100}(k)a_{50,100}(k)$$

By combining the previous equations, the following equation of state is obtained:

$$\begin{cases} a_{50,100}(k) & = a_{50,100}(k-1) + \eta(k-1), \\ u_{50}(k) & = u_{100}(k)a_{50,100}(k) + \mu(k) \end{cases}$$

$$\mu(k) = \epsilon_{100}(k)a_{50,100}(k) - \epsilon_{50}(k)$$

One way of estimating the unknown state vector $a_{50,100}(k)$ that accounts for information on $\epsilon(k)$ and $\mu(k)$ applies a Kalman filtering algorithm referred to as Kalman filter. In practice, this filter provides the solution to the following problem:

$$\min_{a_{50,100}(k)} J(k)$$

with $$J(k) = (a_{50,100}(0) - \bar{a}_{50,100}(0))^T P_0^{-1}(a_{50,100}(0) - \bar{a}_{50,100}(0)) + \sum_{j=1}^{k}(\eta(j-1)^T Q^{-1}\eta(k-1) + \mu(j)^T R^{-1}\mu(j))$$

where $P_0$, $Q$, $R$ are weighting matrices of suitable dimension, $a_{50,100}(0)$. An overbar is the mean value of initial state $a_{50,100}(0)$.

In order to solve the optimization problem using the Kalman filtering algorithm, the following assumptions are made. These assumptions mainly relate to a mathematical interpretation for $P_0$, $Q$, $R$.

$a_{50,100}(0)$ is a random vector which is not correlated with noises $\epsilon(k)$ and $\mu(k)$, $a_{50,100}(0)$ has a known mean with P0 being the covariance matrix, expressed as:

$$P_0 = E[(a_{50,100}(0) - \bar{a}_{50,100}(0))(a_{50,100}(0) - \bar{a}_{50,100}(0))^T]$$

with $\bar{a}_{50,100}(0)$ the mean value of the initial state, $\epsilon(k)$ and $\mu(k)$ are white noises with zero mean which are not correlated with covariance matrices Q and R respectively:

$$E[\eta(k)\eta(j)^T] = \begin{cases} Q, & \text{if } k = j, \\ 0, & \text{if } k \neq j \end{cases}$$

$$E[\mu(k)\mu(j)^T] = \begin{cases} R, & \text{if } k = j, \\ 0, & \text{if } k \neq j \end{cases}$$

$$E[\eta(k)\mu(j)^T] = 0, \text{ for all } k, j$$

It is noted that this assumption also implies that Q and R are positive semi-definite symmetric matrices.

The following notations are adopted:

$\hat{a}_{50,100}(k|k-1)$ is the estimation of $a_{50,100}(k)$ given the time measurements k−1

$\hat{a}_{50,100}(k|k)$ is the estimation of $a_{50,100}(k)$ given the time measurements k $P(k|k-1)$ is the covariance matrix of $a_{50,100}(k)$ given the time measurements k−1

$P(k|k)$ is the covariance matrix of $a_{50,100}(k)$ given the time measurements k.

The Kalman filtering algorithm can then be summarized as follows:

Time update equation:

$$\begin{cases} \hat{a}_{50,100}(k|k-1) & = \hat{a}_{50,100}(k-1|k-1) \\ P(k|k-1) & = P(k-1|k-1) + Q \end{cases}$$

Measurement update equation:

$$\begin{cases} K(k) & = P(k|k-1)u_{100}(k)^T(P(k|k-1) + u_{100}(k)Ru_{100}(k)^T)^{-1} \\ \hat{a}_{50,100}(k|k) & = \hat{a}_{50,100}(k|k-1) + K(k)(u_{50}(k) - u_{100}(k)\hat{x}(k|k-1)), \\ P(k|k) & = (I - K(k))P(k|k-1) \end{cases}$$

By carrying out these steps, induction factor $a_{50,100}$ can be determined. These steps can be repeated to determine induction factors $a_{70,120}$ and $a_{90,140}$.

Figure 6:
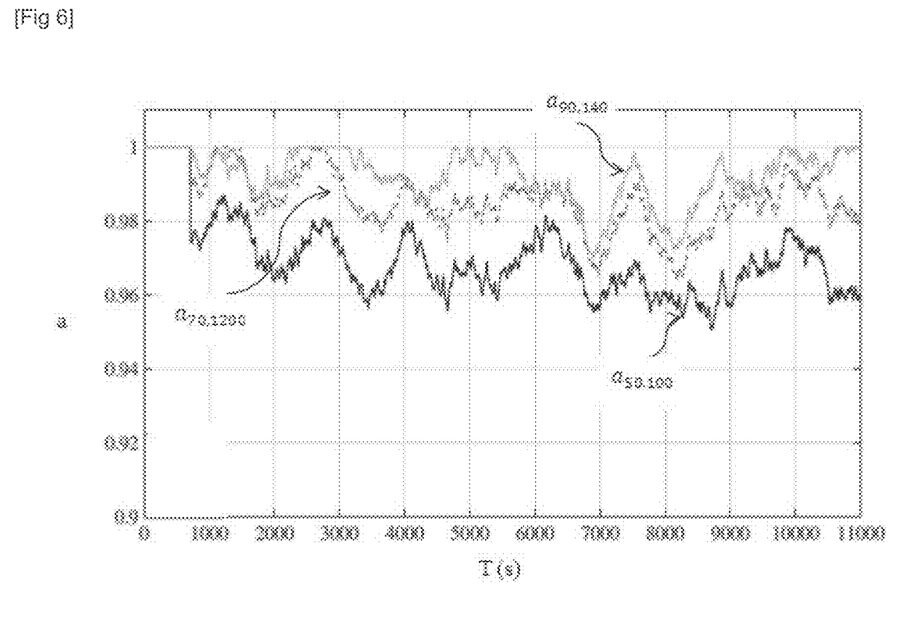
FIG. 6 illustrates the evolution over time of three induction factors between measurement planes obtained by use of the method according to an embodiment of the invention.

FIG. 6 illustrates, by way of non-limitative example, induction factors between measurement planes $a_{50,100}$ (dark grey), $a_{70,120}$ (dotted medium grey) and $a_{90,140}$ (dashed light grey) as a function of time T in seconds. These induction factors are obtained with the method according to the invention. The wind deceleration phenomenon can be seen on the one hand as the closer to the wind turbine, the lower the induction factor between measurement planes. On the other hand, it is observed that the induction factor is variable over time.

Figure 7:
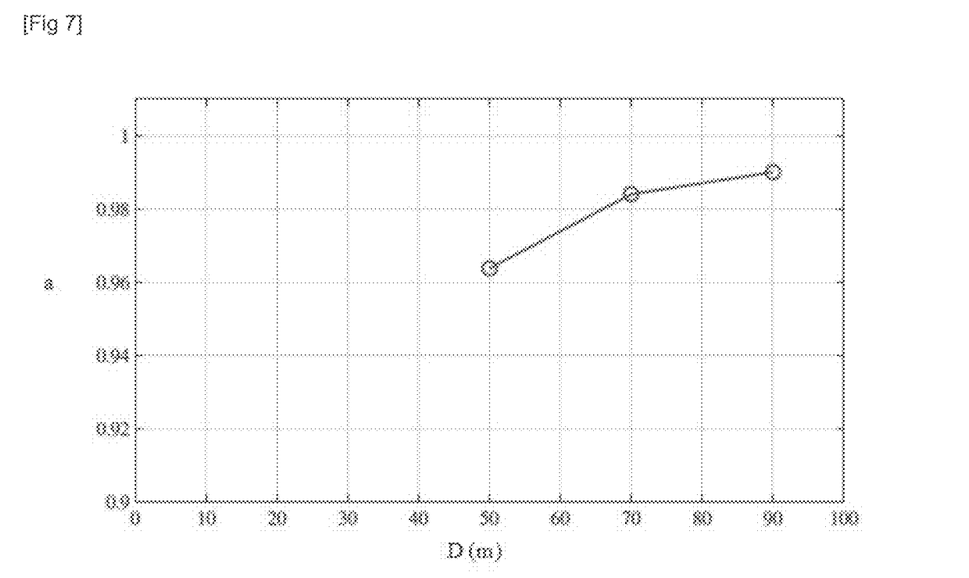
FIG. 7 illustrates the evolution of the induction factor as a function of the distance to the rotor plane for a given time obtained by use of the method according to an embodiment of the invention.

FIG. 7 illustrates, by way of non-limitative example, the evolution of the induction factor between measurement planes a as a function of distance D in meters of the first measurement plane for a given time. The wind deceleration phenomenon and the non-linearity of the induction factor as a function of distance are also observed.

3. Determining the Induction Factor Between a Measurement Plane and the Rotor Plane This step determines in real time the induction factor of the wind between one of the measurement planes and the rotor plane. Thus, the evolution of the wind at the rotor can be represented by accounting for the physical phenomena, in particular the wind deceleration. According to the invention, the induction factor of the wind between a measurement plane and the rotor plane is determined by use of the induction factors determined in the previous step and using a Kalman filter, notably a linear Kalman filter. To simplify, this induction factor is referred to as induction factor in the rotor plane in the description hereafter.

Preferably, the induction factor of the wind can be determined between the measurement plane closest to the rotor and the rotor plane.

For example, in this step, the induction factor can be determined between a measurement plane located 50 m from the rotor and the rotor plane.

According to an embodiment of the invention, the Kalman filter can be used by applying the various steps described below. The steps are described for an embodiment for which $a_{50,100}$, $a_{70,120}$ and $a_{90,140}$ have been determined and for which $a_{0,50}$ is determined, which is the induction factor between a measurement plane located at 50 m and the rotor plane.

Using $a_{50,100}$, $a_{70,120}$ and $a_{90,140}$, the main idea of the estimation of $a_{0,50}$ is to assume that $a_{0,50}$, $a_{50,100}$, $a_{70,120}$ and $a_{90,140}$ depend on distance. The following relation is therefore assumed:

$$\begin{cases} a_{0,50} = 0x_1 + x_2, \\ a_{50,100} = 50x_1 + x_2, \\ a_{70,120} = 70x_1 + x_2, \\ a_{90,140} = 90x_1 + x_2 \end{cases}$$

where $x_1$, $x_2$ are unknown parameters that need to be determined. Since $a_{50,100}$, $a_{70,120}$ and $a_{90,140}$ change slowly over time, the same applies to $x_1$, $x_2$. Therefore, they are expressed as:

$$\begin{cases} x_1(k) = x_1(k-1) + \zeta_1(k-1), \\ x_2(k) = x_2(k-1) + \zeta_2(k-1) \end{cases}$$

where $\zeta_1(k)$, $\zeta_2(k)$ are used to characterize the variation of $x_1(k)$, $x_2(k)$. Therefore, the variation is expressed as:

$$x(k) = \begin{bmatrix} x_1(k) \\ x_2(k) \end{bmatrix}, \zeta(k) = \begin{bmatrix} \zeta_1(k) \\ \zeta_2(k) \end{bmatrix}$$

They can be expressed in compact form:

$$x(k) = x(k-1) + \zeta(k-1).$$

A more realistic model taking account of the noises is:

$$\begin{cases} a_{50,100}(k) = [50 \ 1]x(k) + \epsilon_1(k), \\ a_{70,120}(k) = [70 \ 1]x(k) + \epsilon_2(k), \\ a_{50,100}(k) = [50 \ 1]x(k) + \epsilon_1(k), \end{cases}$$

where $\epsilon 1$, $\epsilon 2$, $\epsilon 3$ are the noises of estimations $a_{50,100}(k)$, $a_{70,120}(k)$ and $a_{90,140}(k)$. They can be expressed as:

$$y(k) = \begin{bmatrix} a_{50,100}(k) \\ a_{70,120}(k) \\ a_{50,100}(k) \end{bmatrix}, C = \begin{bmatrix} 50 & 1 \\ 70 & 1 \\ 90 & 1 \end{bmatrix}, \epsilon(k) = \begin{bmatrix} \epsilon_1(k) \\ \epsilon_2(k) \\ \epsilon_3(k) \end{bmatrix}$$

They can be expressed in compact form:

$$y(k) = Cx(k) + \epsilon(k).$$

By combining the previous equations, the equation of state is obtained as follows:

$$\begin{cases} x(k) = x(k-1) + \zeta(k-1) \\ y(k) = Cx(k) + \epsilon(k) \end{cases}$$

As for $a_{50,100}(k)$, $a_{70,120}(k)$ and $a_{90,140}(k)$, one way of obtaining $x(k)$ that takes account for noises $\zeta(k)$, $\epsilon(k)$ uses the linear Kalman filter technique. The same steps as those described for the previous step are therefore applied.

Once $x(k)$ estimated, induction factor $a_{0,50}$ can be calculated as follows:

$$a_{0,50}(k) = [0 \ 1]x(k).$$

Figure 8:
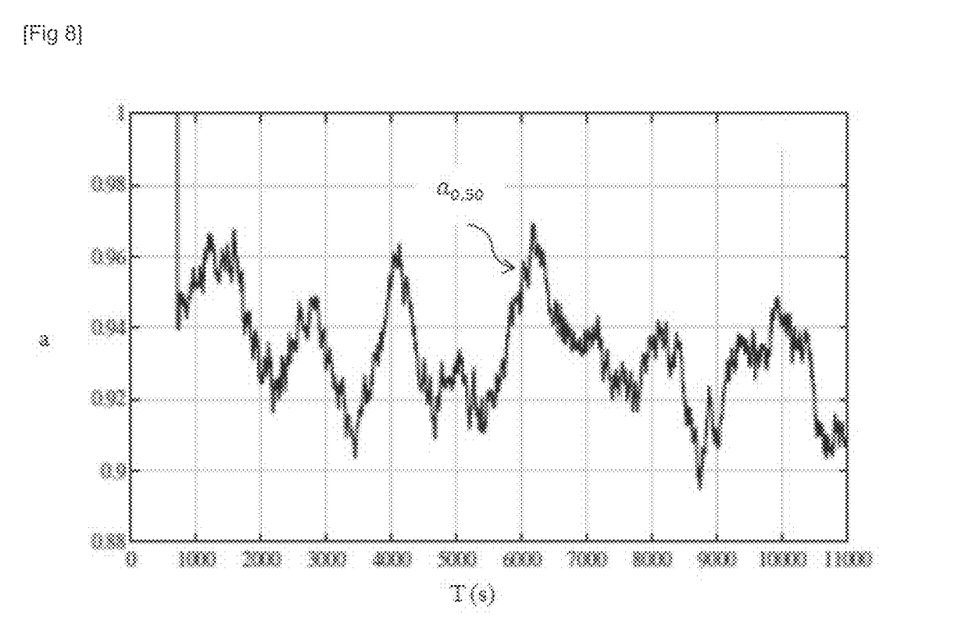
FIG. 8 illustrates the evolution over time of the induction factor of the wind in the rotor plane obtained by use of the method according to an embodiment of the invention.

FIG. 8 illustrates, by way of a non-limitative example, the induction factor in the rotor plane $a_{0,50}$ as a function of time T in seconds. This induction factor is obtained with the method according to the invention from the induction factors of FIG. 6. The wind deceleration phenomenon (induction) can be seen on the one hand with the induction factor at the rotor (FIG. 8) being lower than the induction factors between measurement planes (FIG. 6). On the other hand, it is observed that the induction factor is variable over time. Besides, the evolutions from one induction factor to another are different.

Figure 9:
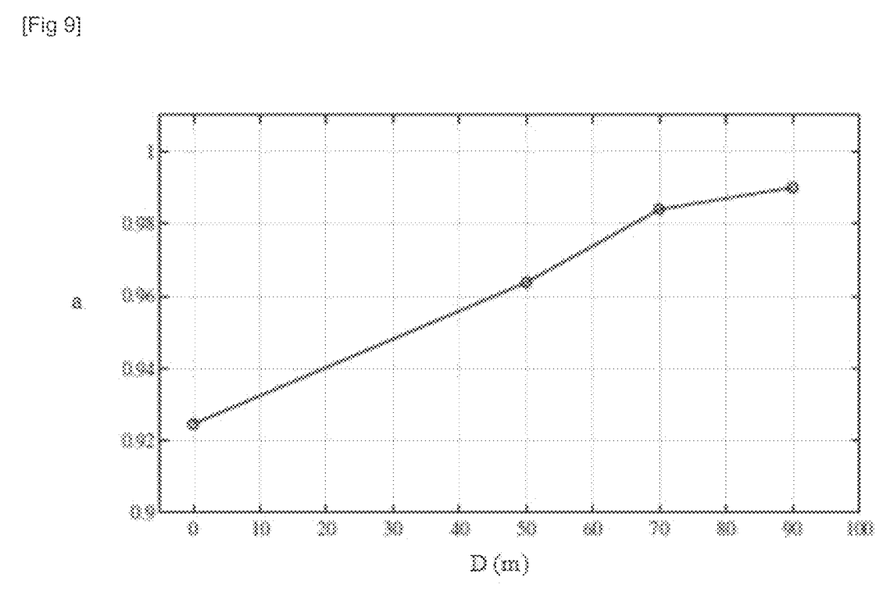
FIG. 9 illustrates the evolution of the induction factor as a function of the distance to the rotor plane for a given time obtained by use of the method according to an embodiment of the invention.

FIG. 9 is a curve similar to FIG. 7 showing, by way of non-limitative example, the evolution of induction factor a as a function of distance D in meters from the first measurement plane for a given time. The wind deceleration phenomenon and the non-linearity of the induction factor as a function of distance are also observed.

Thus, the method according to the invention determines the induction factor of the wind between a measurement plane and the rotor plane in real time.

Applications

Furthermore, the invention relates to a method of determining the wind speed in the rotor plane of a wind turbine equipped with a LiDAR sensor. The following steps are carried out for this method:

determining an induction factor of the wind between a measurement plane and the rotor plane of the wind turbine by use of the method according to any one of the variant combinations described above; and determining the wind speed in the rotor plane of the wind turbine as a function of the induction factor of the wind determined in the previous step, and by use of at least one wind speed measurement used in the previous step with the wind speed measurement corresponding to the wind speed in the measurement plane relative to the measurement plane used for the induction factor.

In other words, if the induction factor between a measurement plane located at distance d2 from the rotor plane is determined in the first step, the measurement of the wind speed in the measurement plane located at distance d2 from the rotor plane is used in the step of determining the wind speed in the rotor plane.

The method according to the invention allows determination online of the wind speed in the rotor plane, in a simple and precise manner (since it takes account of the physical phenomena in the induction zone).

According to an embodiment, the wind speed in the rotor plane can be determined by multiplying (product) the induction factor of the wind by the relative wind speed. The induction factor definition equation can then be expressed as follows:

$$u_0 = u_{d2} \times a_{0,d2}$$

with speed $u_{d2}$ being measured and the induction factor $a_{0,d2}$ being determined by the induction factor determination method.

Figure 3:
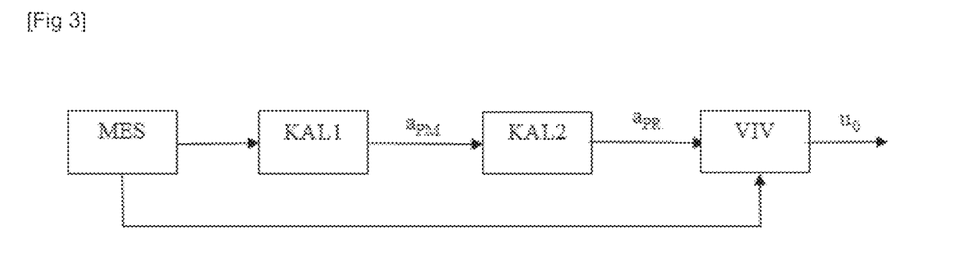
FIG. 3 illustrates the steps of the method of determining the wind speed according to an embodiment of the invention.

FIG. 3 schematically illustrates, by way of non-limitative example, the steps of the method of determining the wind speed in the rotor plane. The first steps are identical to the steps of FIG. 2. The first step is a step (MES) of measuring the wind speed in several measurement planes. The second step uses the measurements and a Kalman filter (KAL1) to determine the induction factors between measurement planes denoted by $a_{PM}$. The third step uses the induction factors between measurement planes $a_{PM}$ to determine, by means of a Kalman filter (KAL2), the induction factor of the wind between a measurement plane and the rotor plane denoted by $a_{PR}$. The fourth step (VIV) determines the wind speed in the rotor plane $u_0$ from the induction factor between a measurement plane and rotor plane $a_{PR}$, and a measurement of the wind speed in the measurement plane considered.

The present invention also relates to a method of controlling a wind turbine equipped with a LiDAR sensor. The following steps are carried out for this method:
  determining the wind speed in the rotor plane by use of the method of determining the wind speed according to any one of the above variants; and
  controlling the wind turbine according to the wind speed in the rotor plane.

Precise real-time knowledge of the wind speed in the rotor plane allows suitable wind turbine control in terms of minimization of the effects on the wind turbine structure and maximization of the recovered power. Indeed, by use of this control, the LiDAR allows reduction of loads on the structure, with the blades and the tower representing 54% of the cost. Therefore, using a LiDAR sensor allows optimizing the wind turbine structure and thus decreasing the costs and maintenance.

According to an implementation of the invention, at least one of the inclination angle of the blades and the electrical recovery torque of the wind turbine generator can be controlled as a function of the wind speed. Other types of regulation devices can also be used.

According to an embodiment of the invention, at least one of the inclination angle of the blades and the electrical recovery torque are determined by use of wind turbine maps as a function of the wind speed at the rotor. For example, the control method described in French patent application FR-2,976,630 A1 which corresponds to US 2012-0,321,463 can be applied.

Figure 4:
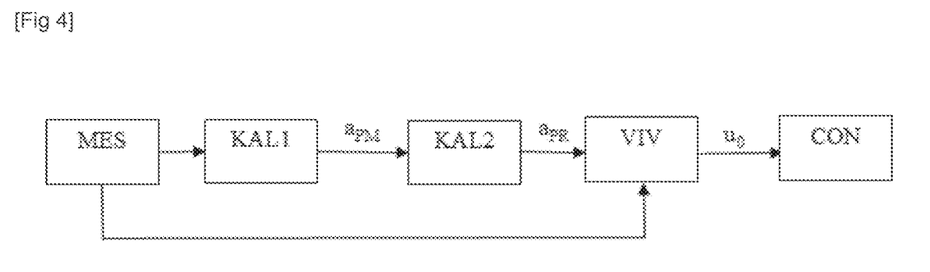
FIG. 4 illustrates the steps of the wind turbine control method according to an embodiment of the invention.

FIG. 4 schematically illustrates, by way of non-limitative example, the steps of the wind turbine control determination method. The first steps are identical to the steps of FIG. 3. The first step is a step (MES) of measuring the wind speed in several measurement planes. The second step uses the measurements and a Kalman filter (KAL1) to determine the induction factors between measurement planes denoted by $a_{PM}$. The third step uses the induction factors between measurement planes $a_{PM}$ to determine, by use of a Kalman filter (KAL2), the induction factor of the wind between a measurement plane and the rotor plane denoted by $a_{PR}$. The fourth step (VIV) determines the wind speed in the rotor plane $u_0$ from the induction factor between a measurement plane and rotor plane $a_{PR}$, and a measurement of the wind speed in the measurement plane being considered. The fifth step (CON) relates to the wind turbine control as a function of wind speed $u_0$ in the rotor plane.

Furthermore, the invention relates to at least one of a diagnosis and monitoring for a wind turbine equipped with a LiDAR sensor, wherein the following steps are carried out:
  determining an induction factor of the wind between a measurement plane and the rotor plane of the wind turbine by use of the induction factor determination method according to any one of the variant combinations described above;
  determining the aerodynamic power drawn from the wind by the wind turbine by use of the induction factor determined in the previous step; and
  at least one of diagnosing monitoring the operation of the wind turbine according to the aerodynamic power determined in the previous step.

By use of the induction factor expressing the wind deceleration due to the presence of the wind turbine in the wind field, it is possible to determine from this induction factor the aerodynamic power drawn from the wind by the wind turbine. According to an embodiment, the aerodynamic power drawn $P_{aéro}$ expressed by the relationship below can be determined by use of induction factor a, the speed of the free wind flow $V_{inf}$, the air density Ro and the surface area of the wind turbine $A_d$, $$P_{aéro} = 2 Ro A_d V_{inf}^3 a(1-a)^2$$

The aerodynamic power drawn provides information on the operation of the wind turbine, which enables at least one diagnosis and monitoring of the wind turbine operation. The fundamental operation compares the electrical power produced by the wind turbine with the theoretical electrical power given by the previous equation.

The ratio of the two powers allows performing at least one of diagnosis and monitoring of the operation and of the effective aerodynamic yield of the wind turbine.

Real-time update of the induction factor also allows to quantify the aerodynamic thrust loads applied on the wind turbine and to deduce therefrom an estimation of the cumulative fatigue damage. According to an implementation of the invention, this can be done using the relation that connects the thrust coefficient $C_T$ to the induction factor (Burton, Wind Energy Handbook, ch. 3.2), which can be written as follows: $C_T = 4a(1-a)$.

Furthermore, online estimation of the induction factor can allow development and updating in real time simplified wind turbine wake models. This allows performing operation diagnoses at a wind farm scale including identifying risk zones with wake interaction between neighboring wind turbines.

Figure 5:
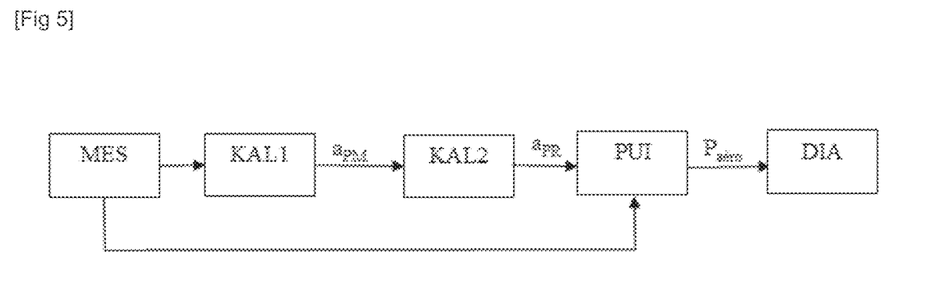
FIG. 5 illustrates the steps of a wind turbine diagnosis method according to an embodiment of the invention.

FIG. 5 schematically illustrates, by way of non-limitative example, the steps of the method of determining the wind speed in the rotor plane. The first steps are identical to the steps of FIG. 2. The first step is a step (MES) of measuring the wind speed in several measurement planes. The second step uses the measurements and a Kalman filter (KAL1) to determine the induction factors between measurement planes denoted by $a_{PM}$. The third step uses the induction factors between measurement planes $a_{PM}$ to determine, by use of a Kalman filter (KAL2), the induction factor of the wind between a measurement plane and the rotor plane denoted by $a_{PR}$. The fourth step (PUI) determines the aerodynamic power drawn from the wind $P_{aéro}$ from the induction factor between a measurement plane and rotor plane $a_{PR}$, and a wind speed measurement in the measurement plane. The fifth step (DIA) performs diagnosis or monitoring of the wind turbine according to the aerodynamic power drawn $P_{aéro}$.

Furthermore, the invention relates to a computer program product comprising code instructions designed to carry out the steps of one of the methods described above for an induction factor determination method, speed determination in the rotor plane, control method, including at least one of diagnosis and monitoring method. The program is executed on a unit for processing the LiDAR sensor, or on any similar medium connected to the LiDAR sensor or to the wind turbine.

According to an aspect, the present invention also relates to a LiDAR sensor for a wind turbine, comprising a processing unit configured to implement one of the methods described above (induction factor determination method, speed determination in the rotor plane, control method, and at least one of diagnosis and monitoring).

According to an implementation of the invention, the LiDAR sensor can be a scanning LiDAR, a continuous wave LiDAR or a pulsed LiDAR sensor. Preferably, the LiDAR sensor is a pulsed LiDAR sensor.

The invention also relates to a wind turbine, notably for an offshore or an onshore wind turbine equipped with a LiDAR sensor as described above. According to an embodiment of the invention, the LiDAR sensor can be arranged on the nacelle of the wind turbine. The LiDAR sensor is so oriented to perform a measurement of the wind upstream from the wind turbine (that is before the wind turbine and along the longitudinal axis thereof, designated by axis x in FIG. 1). According to an embodiment, the wind turbine can be similar to the wind turbine illustrated in FIG. 1.

For the embodiment of the control method, the wind turbine can comprise a control use, for example for control of the pitch angle of a wind turbine blade or of the electrical torque, for implementing the method according to the invention.

For the embodiment of at least one of the diagnosis and monitoring method, the wind turbine can comprise at least one of wind turbine operation diagnosis and monitoring use.

The invention claimed is:

1. A method of controlling a wind turbine equipped with a LiDAR sensor performing a measurement relative to wind speed in at least three measurement planes separated in space from the wind turbine, comprising:

A. determining an induction factor of wind between a measurement plane and a rotor plane of a wind turbine equipped with a LiDAR sensor, the induction factor of the wind representing a wind deceleration coefficient defined as a ratio of wind speeds between two separate points upstream from the wind turbine resulting from deceleration of the wind in the planes caused by operation of the wind turbine in a wind field, by:
 a) measuring the wind speed in at least three measurement planes separated in space from the wind turbine by use of the LiDAR sensor;
 b) determining at least two induction factors of the wind between two of the measurement planes by providing the wind speed measurements as inputs to a first linear Kalman filter to produce an output of the linear induction factors in the two measurement planes; and
 c) determining the induction factor of the wind between of one at least two of the measurement planes and the rotor plane of the wind turbine by using the output of the determined induction factors from the first linear Kalman filter as inputs to a second linear Kalman filter to produce an output of the induction factor from the second linear Kalman filter;

B. determining the wind speed in the rotor plane as a function of the induction factor of the wind between one of the at least two of the measurement planes and the rotor plane of the wind turbine by using wind speed measurements in the measurement plane relative to the induction factor of the wind between one of the at least two of the measurement planes and the rotor plane; and C. controlling the wind turbine as a function of the wind speed in the rotor plane.

2. A method as claimed in claim 1, wherein the at least two induction factors of the wind are determined between the measurement planes having known spacings which are equal to a distance between the rotor plane and a measurement plane closest to the rotor plane.

3. A method as claimed in claim 2, wherein the wind speed measurement is performed in at least four measurement planes and at least three induction factors of the wind are determined between two measurement planes.

4. A method as claimed in claim 1, wherein the wind speed measurement is performed in at least four measurement planes and at least three induction factors of the wind are determined between two measurement planes.

5. A method as claimed in claim 1, wherein the wind speed in the rotor plane corresponds to multiplication of the induction factor of the wind between a measurement plane and the rotor plane of a wind turbine by the wind speed in the measurement plane relative to the induction factor of the wind.

6. A computer program product comprising code instructions stored on a tangible storage medium which when executed by a processor of the LiDAR sensor which performs steps of the method of claim 1 when the program is executed on a processor of the LiDAR sensor.

7. A LiDAR sensor for a wind turbine, comprising a processor implementing the method of claim 1.

8. A wind turbine comprising the LiDAR sensor recited in claim 7 in which the LiDAR sensor is located on the nacelle of the wind turbine.

* * * * *